(12) United States Patent
Wyant

(10) Patent No.: US 6,315,316 B1
(45) Date of Patent: Nov. 13, 2001

(54) PORTABLE BALL HITCH ASSEMBLY

(76) Inventor: Walter Wyant, Rte. 1 Box 42 B, Blair, OK (US) 73526

( * ) Notice: Subject to any disclaimer, the term of this patent is extended or adjusted under 35 U.S.C. 154(b) by 0 days.

(21) Appl. No.: 09/245,771

(22) Filed: Feb. 5, 1999

(51) Int. Cl.$^7$ .................................................. B60D 1/06
(52) U.S. Cl. ........................................ 280/511; 280/415.1
(58) Field of Search ............................. 280/416.1, 415.1, 280/504, 511

(56) References Cited

U.S. PATENT DOCUMENTS

| | | | |
|---|---|---|---|
| D. 415,725 | * 10/1999 | Wyant | D12/162 |
| 2,506,090 | 5/1950 | Lee . | |
| 2,911,233 | 11/1959 | Riddle . | |
| 4,280,713 | * 7/1981 | Bruhn | 280/415.1 |
| 4,456,279 | 6/1984 | Dirck . | |
| 4,807,900 | 2/1989 | Tate . | |
| 5,106,114 | 4/1992 | Haupt . | |
| 5,322,313 | 6/1994 | Schroeder . | |
| 5,351,982 | * 10/1994 | Walrath | 280/416.1 |
| 5,560,630 | 10/1996 | Phares et al. . | |
| 5,722,678 | 3/1998 | Hunger . | |
| 5,725,229 | 3/1998 | McWethy . | |
| 5,788,257 | 8/1998 | Meyerhofer . | |
| 5,857,693 | * 1/1999 | Clark | 280/415.1 |

* cited by examiner

Primary Examiner—Robert P. Olszewski
Assistant Examiner—Michael Cuff
(74) Attorney, Agent, or Firm—Kilpatrick Stockton LLP

(57) ABSTRACT

A hitch mount assembly that has an elongate support member having a longitudinal axis for parallel orientation with a longitudinal axis of a towing vehicle. The elongate support member includes a connective end that is adapted to be coupled to a receiver on a towing vehicle and a table support end that is oppositely located from the connective end. A turntable is rotatably coupled to the elongate support member at the table support end by a rotation facilitating mounting. A plurality of hitch ball assemblies are mounted to the turntable and each hitch ball assembly has a ball portion positioned above the turntable, a post portion that extends through the turntable through a ball mounting aperture in the turntable, and a threaded end of the post portion extending below the turntable. A spacing member is interposed between the turntable and the elongate support member. The spacing member is configured to establish a clearance space between a lower surface of the turntable and an upper surface of the elongate support member. This space must be adequate to accommodate rotational travel of the threaded ends of the post portions between the lower surface of the turntable and the upper surface of the elongate support member. So that the distance across this clearance space is as short as possible, the height of the space is only slightly greater than the length of the extending threaded end of the post portion below the lower surface of the turntable. In this manner, the clearance space is minimized thereby also minimizing a length of a moment are measured between the turntable and the elongate support member. This is important because it minimized any twisting effect experienced in the hitch mount assembly by the forward force of the towing vehicle and the backward drag of the trailer being towed. The rotation facilitating mounting is adapted to accommodate 360 degree rotation of the turntable relative to the elongate support member when the plurality of hitch bass assemblies are mounted to the turntable.

15 Claims, 5 Drawing Sheets

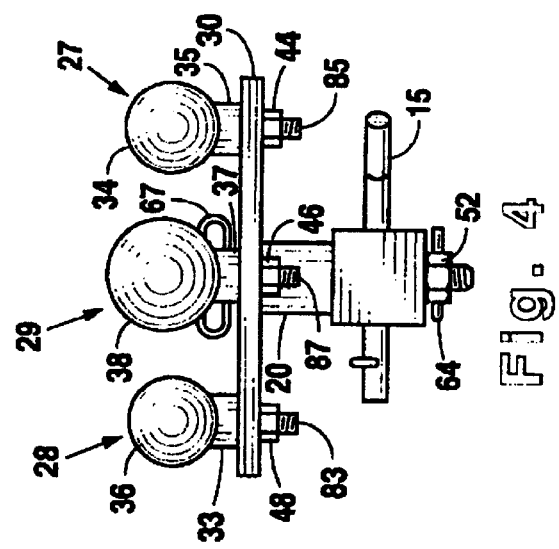
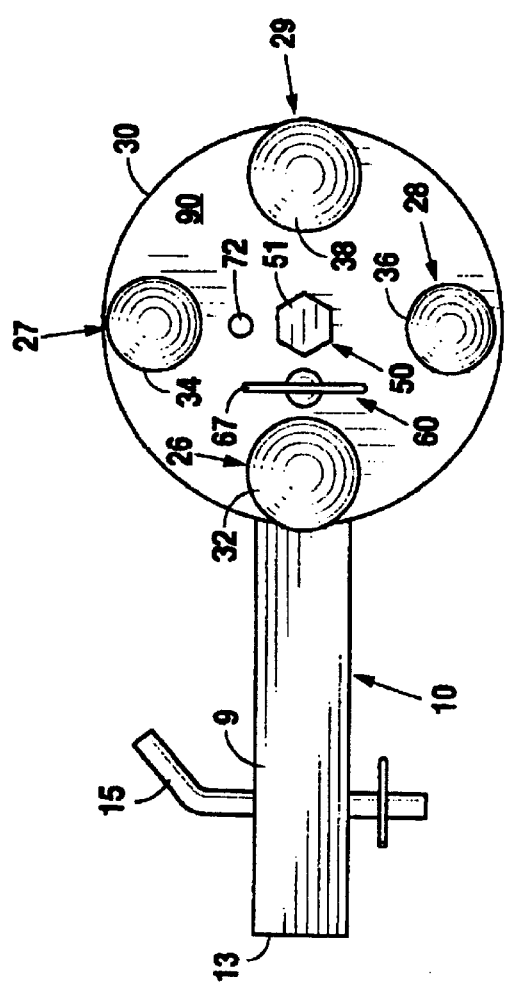
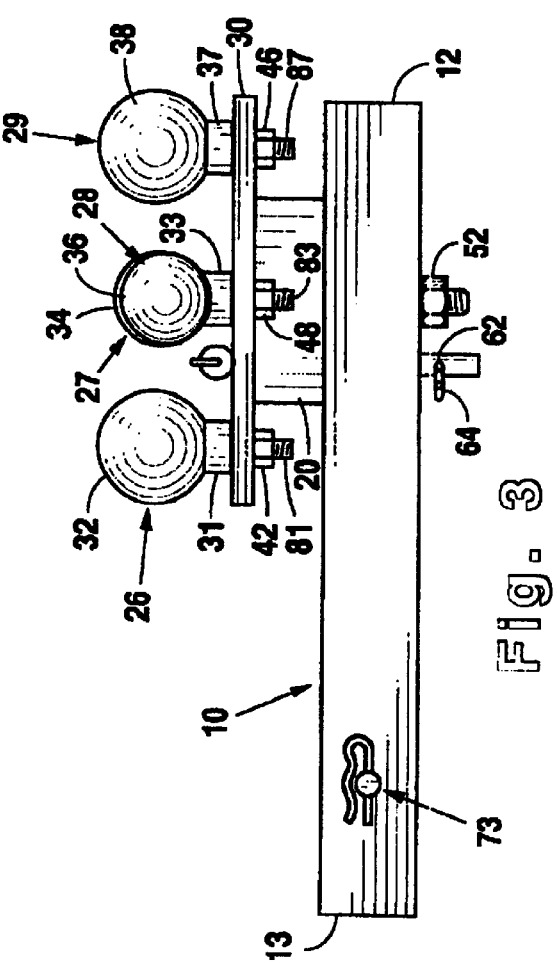

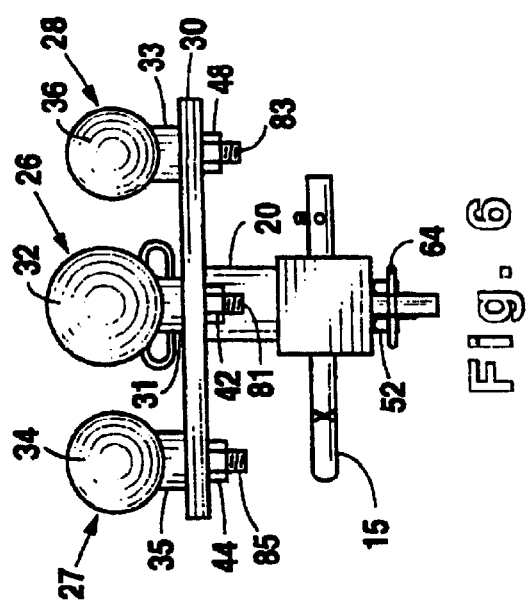
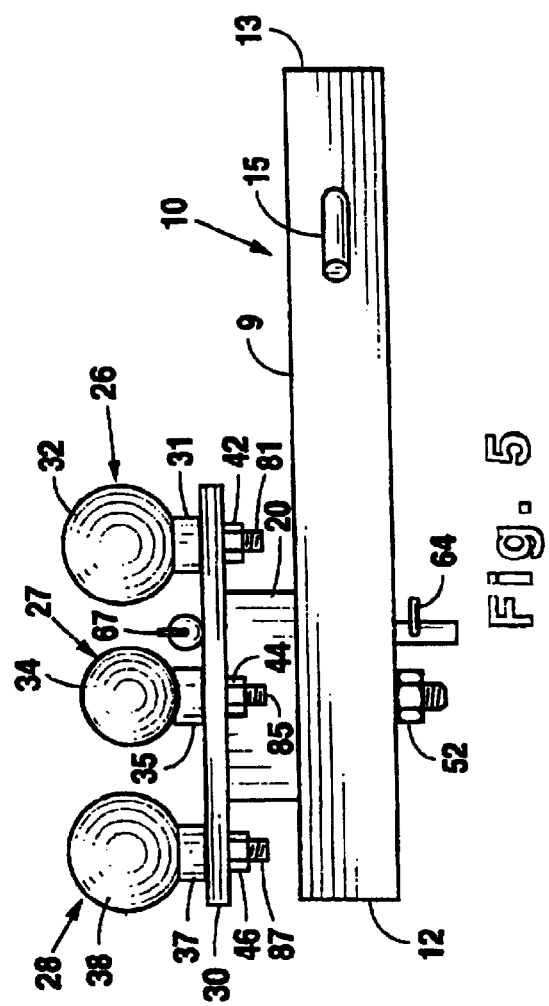
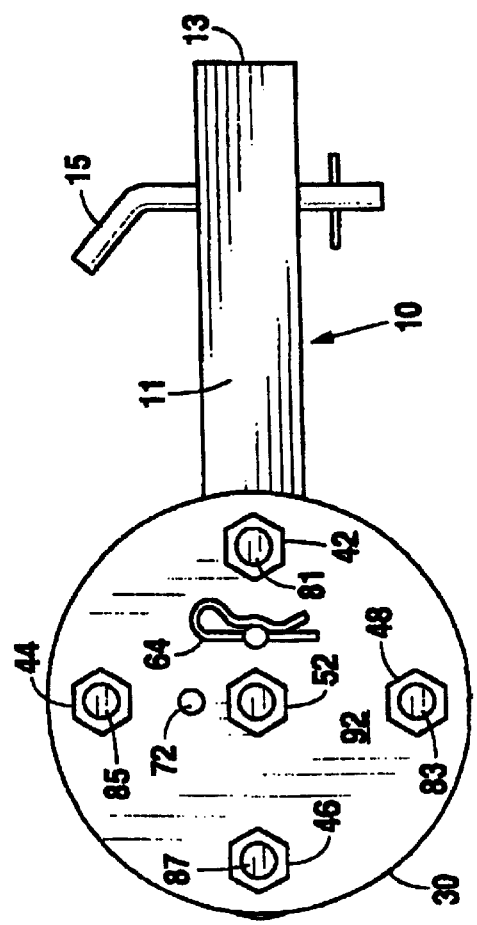

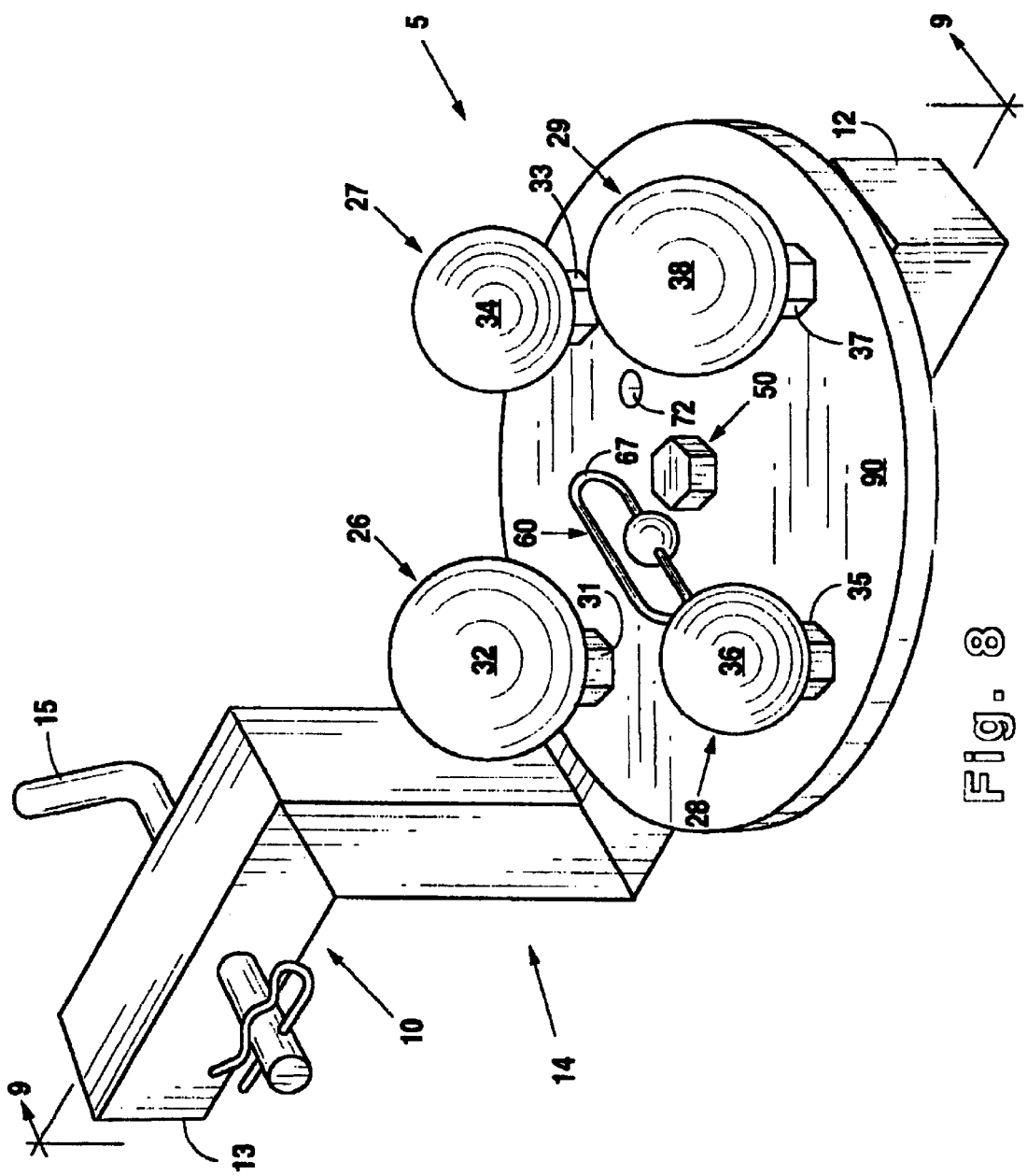

PORTABLE BALL HITCH ASSEMBLY

TECHNICAL FIELD

The present invention relates generally to improvements in trailer hitches, and more specifically to a portable ball hitch assembly.

BACKGROUND ART

There are numerous styles of conventional hitch attachments on the current market for towing vehicles where attempts have been made to design a hitch capable of accommodating differently sized hitch balls. Most of these hitches, however, include disadvantages.

A cluster-type hitch is depicted in Riddle U.S. Pat. 2,911,233 issued Nov. 3, 1959. The Riddle device includes a plate carried by an upstanding sleeve and having a plurality of various sized ball connectors disposed on the outer face. This structure, however, has many disadvantages based on numerous weak points in the construction of the device. For example, relatively great loads or stresses are placed on a hitch of this type at the juncture between the upstanding sleeve and the brackets securing the device to the vehicle which can cause device failure at the weak points resulting in the hitch collapsing or failing to function properly.

A Multiple Connection Trailer Hitch apparatus is shown in U.S. Pat. No. 4,456,279 to Dirck issued Jun. 26, 1984. The Dirck device includes a rotatable plate member and has at least two connection members of varying diametric sizes secured to a safety bumper of a vehicle. The plate is connected with the bumper by a sleeve and bolt arrangement whereby a locking pin is removed for permitting rotation of the plate to the desired position. The Dirck apparatus, however, also has disadvantages because of its inability to accommodate more than two hitch balls (See FIG. 5) at anyone time due to its small plate diameter. Secondly, the Dirck structure uses two plates on top of one another; and then when using ball type hitches, the balls must be welded onto the top plate preventing the use of the stronger standard-type ball and threaded stem assembly. This type of hitch further restricts the use of a standard pin-type hitch connection. A further problem with the Dirck apparatus is that the plates are bolted through the center. Therefore, when a large load is placed upon the hitch there is a tendency for the hitch to torque about the center bolt.

In view of the above described deficiencies associated with the use of known designs for multiple ball trailer hitch connections, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed multiple connection trailer hitches and incorporates several additionally beneficial features. It is, therefore, an object of the present invention to provide a portable ball hitch assembly capable of having as many as, or more than four differently sized connection points to assist standard vehicles by allowing for more variety and a closer fit depending on the size of the connection member chosen. Secondly, it is an object of the present invention to provide a multiple ball hitch capable of accepting standard bolts of various-sized hitch connection members, as well as the hitch being able to utilize a standard hitch pin for releasable connection to the towing vehicle. The preceding objects are accomplished by providing a portable ball hitch assembly. The beneficial effects described above apply generally to the exemplary devices and mechanisms disclosed herein of the portable ball hitch assembly. The specific structures through which these benefits are delivered will be described in detail hereinbelow.

In at least one embodiment, the present invention takes the form of a hitch mount assembly that has an elongate support member with a longitudinal axis for parallel orientation with a longitudinal axis of a towing vehicle. The elongate support member includes a connective end that is adapted to be coupled to a receiver on a towing vehicle and a table support end that is oppositely located from the connective end. A turntable is rotatably coupled to the elongate support member at the table support end by a rotation facilitating mounting. A plurality of hitch ball assemblies are mounted to the turntable and each hitch ball assembly has a ball portion positioned above the turntable, a post portion that extends through the turntable through a ball mounting aperture in the turntable, and a threaded end of the post portion which extends below the turntable. A spacing member is interposed between the turntable and the elongate support member. The spacing member is configured to establish a clearance space between a lower surface of the turntable and an upper surface of the elongate support member. This space must be adequate to accommodate rotational travel of the threaded ends of the post portions between the lower surface of the turntable and the upper surface of the elongate support member. So that the distance across this clearance space is as short as possible, the height of the space is only slightly greater than the length of the extending threaded end of the post portion below the lower surface of the turntable. In this manner, the clearance space is minimized thereby also minimizing a length of a moment arm measured between the turntable and the elongate support member. This is important because it minimizes any twisting effect experienced in the hitch mount assembly by the forward force of the towing vehicle and the backward drag of the trailer being towed. The rotation facilitating mounting is adapted to accommodate 360 degree rotation of the turntable relative to the elongate support member when the plurality of hitch ball assemblies are mounted thereupon.

In one embodiment, the elongate support additionally includes an intermediate portion located between the connective end and the table support end thereof. The intermediate portion is configured to lower the table support end below the connective end. This enables proper positioning of the plurality of ball assemblies for trailer tongue connections thereto when the receiver on the towing vehicle upon which the hitch mount assembly is installed is at an above-standard height above ground. An example of such a situation is a jacked-up pick-up truck pulling a standardly configured boat trailer.

From a visual perspective, the connective end, the table support end and the intermediate portion together form a substantially Z-shaped elongate support member. In the illustrated embodiment, the intermediate portion of the elongate support member is oriented at substantially right angles to the connective end and to the table support end. As a result, the intermediate portion of the elongate support member is oriented substantially upright when the hitch mount assembly is properly installed upon a towing vehicle. In the interest of inexpensive manufacture, the connective end, the table support end and the intermediate portion may be constructed from sections of square-shaped tubular steel or solid steel bar that are welded together.

As illustrated, a preferred embodiment of the invention specifies that the plurality of hitch ball assemblies number at least four, and further, the plurality of hitch ball assemblies are diametrically and equally spaced upon the turntable. Each ball portion of the plurality of hitch ball assemblies is differently sized thereby providing a selection of ball sizes to a user for accommodating differently configured trailer connections. Still further, each hitch ball assembly is secured to the turntable by a threaded nut screwably engaged upon the threaded end of the post portion and tightened up against the lower surface of the turntable.

For use, the connective end of the elongate support is configured for insertable reception into a complementarily shaped receiver mounted on a towing vehicle. In a preferred embodiment, an insertable portion of the connective end of the elongate support is square shaped. To facilitate connection of the hitch mount assembly to the towing vehicle, the insertable portion of the connective end of the elongate support has a securing aperture therethrough for receiving a fastening pin therein. Such a fastening pin is preferably adapted for aligned insertion through the securing aperture and an aligned aperture in the receiver mounted on the towing vehicle for releaseably securing the elongate support member thereto.

A locking mechanism is adapted to releaseably fix the turntable with respect to the elongate support member. It includes alignable apertures through the turntable and the spacing member and/or the elongate support member and an insertable locking pin configured for removable insertion through the alignable apertures. Each locking aperture is diametrically aligned with at least one hitch ball assembly, and preferably between a pair of diametrically oppositely oriented hitch ball assemblies.

The beneficial effects described above apply generally to the exemplary devices and mechanisms disclosed herein of the portable ball hitch assembly. The specific structures through which these benefits are delivered will be described in detail hereinbelow.

BRIEF DESCRIPTION OF THE DRAWINGS

The invention will now be described in greater detail in the following way of example only and with reference to the attached drawings, in which:

FIG. 2 is a top plan view of the present invention further showing the components and the orientation of the invention;

FIG. 3 is a left-hand side elevational view of the present invention;

FIG. 4 is a front elevational view of the present invention;

FIG. 5 is a right-hand side elevational view of the present invention;

FIG. 6 is a rear elevational view of the present invention;

FIG. 7 is a bottom plan view of the portable ball hitch assembly;

FIG. 8 is a perspective view of a second embodiment of the portable ball hitch assembly.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
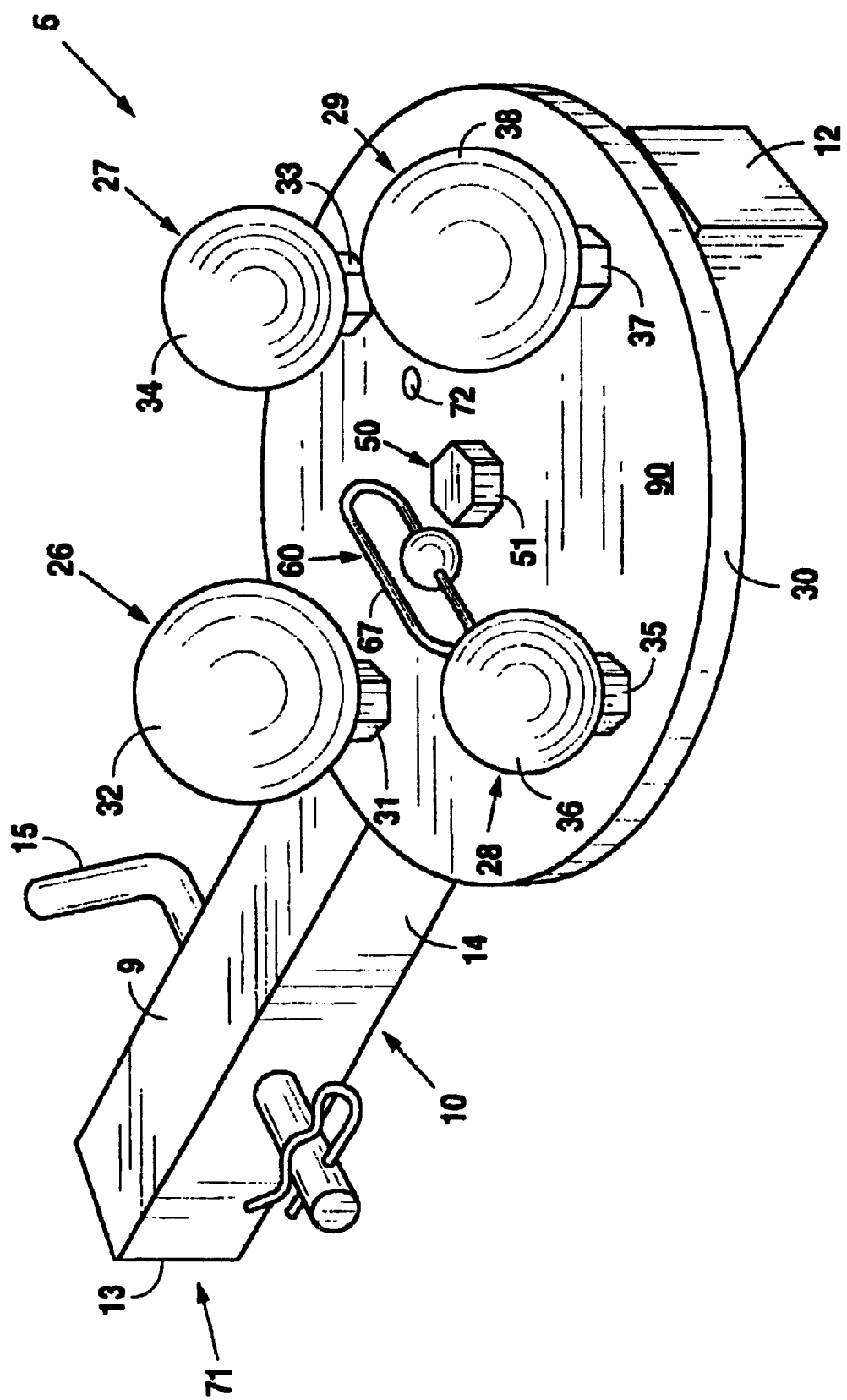
FIG. 1 is a perspective view of the Portable Ball Hitch Assembly depicting the orientation of its major components.

Referring to the drawings, FIG. 1 generally indicates a hitch mount assembly 5 that is fixedly secured to an elongate support member 10. The elongate support member 10 is conventionally mountable onto a vehicle and is locked into position by the use of a securing aperture 73 configured to receive a fastening pin 15 therein. The elongate support member 10 has a longitudinal axis and maintains a parallel orientation with a longitudinal axis of a towing vehicle upon which it is mounted. Specifically, the elongate support member 10 includes a connective end 13 and a table support end 12. The connective end 13 is adapted to be coupled to a receiver on a towing vehicle where the table support end 12 is oppositely located from the connective end 13. The elongate support member 10 may further comprise an intermediate portion 14 located between the connective end 13 and the table support end 12. The intermediate portion 14 is configured to lower the table support end 12 below the connective end 13 to enable desired positioning of the hitch ball assemblies (26, 27, 28, 29). Collectively, the table support end 12, the intermediate portion 14 and the connective end 13 configure a substantially Z-shaped elongate support member 10 and is preferably constructed from square-shaped and welded tubular or solid steel bar. The intermediate portion 14 of the elongate support member 10 may be oriented at substantially right angles to the connective end 13 and to the table support end 12 which establishes a substantially upright orientation of the intermediate portion 14 when the hitch mount assembly 5 is properly installed upon a towing vehicle.

The connective end 13 is configured for insertion into a complementarily shaped receiver mounted on a conventional towing vehicle. The insertable portion 71 of the connective end 13 of the elongate support member 10 is preferably square and has the securing aperture 73 therethrough to receive the fastening pin 15. The fastening pin 15 is aligned for insertion through the securing aperture 73 in the hitch mount assembly 5 and an aligned aperture in the hitch receiver mounted on the vehicle.

The hitch mount assembly 5 is comprised of a turntable 30 of a circular configuration having a central aperture 70, at least one locking pin aperture 72 and a plurality of ball mounting apertures (74, 75, 76, 77). The central aperture 70 extends through the turntable 30 to facilitate the establishment of a rotation mounting 50. The turntable 30 is rotatably coupled to the table support end 12 of the elongate support member 10 by the rotation facilitating mounting 50 which includes a shoulder bolt 51 inserted into the central aperture 70 of the turntable 30, through the entire depth of a spacing member 20 and passes into and out of the upper surface 9 and lower surface 11 of the table support end 12 of the elongate support member 10. When the turntable 30 is properly positioned, a shoulder bolt nut 52 is disposed over a lower end of the shoulder bolt 51 and tightened against the lower surface 11 of the elongate support member 10 in order to retain the turntable 30 in an operational configuration.

The turntable 30 is provided with a plurality of hitch ball assemblies (26, 27, 28, 29) spaced radially from the central aperture 70 of the turntable 30. The hitch ball assemblies (26, 27, 28, 29) are rigidly secured to the turntable 30 and are diametrically and equi-distantly located axially outward from the central aperture 70. Each of the hitch ball assemblies (26, 27, 28, 29) includes a ball portion (32, 34, 36, 38) a and a post portion (31, 33, 35, 37) having at least a threaded end (81, 83, 85, 87). The ball portions (32, 34, 36, 38) are positioned at a top surface 90 of the turntable 30 and the post portions (31, 33, 35, 37) extend through the ball mounting apertures (74, 75, 76, 77) in the turntable 30. The post portions (31, 33, 35, 37) in turn are rigidly secured within the turntable 30. The several ball portions (32, 34, 36, 38) may be of varying diametric sizes. A nut (42, 44, 46, 48) is disposed over the threaded end (81, 83, 85, 87) of each post portion (31, 33, 35, 37) and tightened against the lower surface 92 of the turntable 30 accomplishing securement thereto. In a most preferred embodiment, the plurality of hitch ball assemblies (32, 34, 36, 38) number four.

A locking mechanism 67 cooperates with one or more apertures through the turntable 30 for fixing the turntable 30 positionally during use of the hitch mount assembly 5. In a preferred embodiment, the locking mechanism 67 is positioned directly behind the rotation mounting 50. At least one locking aperture 62 extends through the turntable 30 so that the locking aperture 62 is diametrically aligned with the hitch ball assembly (26, 27, 28, or 29) to which the trailer being towed is hitched. Further, the locking aperture 62 may extend through the turntable 30 and be diametrically aligned with a pair of diametrically oppositely oriented hitch ball assemblies (26, 27, 28, 29). In the illustrated embodiment, the locking mechanism 67 is inserted through the upper surface 90 of the turntable 30, through the entirety of the spacing member 20 and passes out of the lower surface 11 of the elongate support member 10. The locking mechanism 67 is restricted from vertical movement when in an engaged configuration due to the use of a locking mechanism retaining clip 64 located on the lower end of the locking mechanism 67. Preferably, the locking mechanism 67 is adapted to releaseably secure the turntable 30 to the table support end 12 of the elongate support member 10. A pin of the locking mechanism 67 is inserted into the aligned apertures 62 in the turntable 30 and extends through the spacing member 20 and into the table end 12 of the elongate support member 10. An enlarged head portion 60 of the locking mechanism 67 act as a stop to establish proper positioning of the pin.

FIG. 2 displays a top plan view of the major components of the present invention. FIG. 2 generally displays the circular turntable 30 being attached on the hitch mount assembly 10 by a rotation facilitating mounting 50. Spaced radially from the rotation mounting 50 are four hitch ball assemblies (26, 27, 28, 29) which are diametrically-spaced from a cental aperture 70 of the turntable 30. These ball assemblies (26, 27, 28, 29) are rigidly secured to the face of the turntable 30 by four nuts (42, 44, 46, 48). Each nut is fastened over the outer end of each ball assembly (26, 27, 28, 29) against the lower surface 92 of the turntable 30.

FIG. 3 depicts a side elevational view of the portable ball hitch assembly. FIG. 3 conveys the relationship of the major components of the present invention. The turntable 30 maintains four securedly attached hitch ball assemblies (26, 27, 28, 29). A spacing member 20 is positioned between the turntable 30 and the elongate support member 10. The spacing member 20 is configured to establish a clearance space between the lower surface 92 of the turntable 30 and an upper surface 9 of the elongate support member 10 in order to accommodate 360 degree rotational travel of threaded ends of the post portions (31, 33,35,37) of the hitch ball assemblies (26, 27, 28, 29) positioned between the lower surface 92 of the turntable 30 and the upper surface 9 of the elongate support member 10. The clearance space has a height slightly greater than a length of the extending threaded ends (81, 83, 85, 87) of the post portions (31, 33, 35, 37) below the lower surface 92 of the turntable 30. In turn, the clearance space is minimized thereby resulting in a minimized length of a moment arm that is measured between the turntable 30 and the elongate support member 10. At the lower surface 11 of the elongate support member 10, the lower end of the axial shoulder bolt 51 is secured by a shoulder bolt nut 52 that is tightened against the lower surface 11 of the elongate support member 10. Furthermore, a locking mechanism 67 is inserted into the turntable 30, running through the spacing member 20 and extending outward from the bottom surface 11 of the elongate support member 10. The locking mechanism 67 is then secured by a retaining clip 64 to restrict vertical movement when the locking mechanism 67 is in an engaged position.

FIG. 4 depicts the left-hand side view of the present invention. FIG. 4 shows the relationship of the major components from a different perspective. In FIG. 4, the turntable 30 continues to depict diametrically-spaced hitch ball assemblies (26, 27, 29 where 28 is not shown) as being securely fastened to the turntable 30 by a nut (42, 44, 48 where 46 is not shown). The turntable 30 is mounted on the spacing member 20 and in turn the spacing member 20 is connected to the elongate support member 10.

FIG. 6 presents the orientation of the components from a right-hand side perspective of the present invention. The turntable 30 continues to maintain hitch ball assemblies (27, 28, 29 where 26 is not shown) which are securely fastened to the turntable 30 by a nut (44, 46, 48 where 42 is not shown). The turntable 30 is connected to the spacing member 20 and the spacing member 20 is mounted to the elongate support member 10. The rotation mounting 50 (not shown in FIG. 6) fastens these three components (the turntable 30, the spacing member 20 and the elongate support member 10) together by a nut 52 on the bottom of the elongate support member 10. A fastening pin 15 is passed through the elongate support member 10 to maintain rigidity. The locking mechanism 67, is passed through the turntable 30, the spacing member 20 and the elongate support member 10 and is secured by a retaining clip 64 at the bottom of the elongate support member 10.

FIG. 7 includes a bottom view of the turntable 30. The lower surface 11 of the turntable 30 shows that each of the four diametrically-spaced hitch ball assemblies (26, 27, 28, 29) are securely fastened to the turntable 30 by a nut (42, 44, 46, 48). The rotation mounting 50, located at the central aperture 70 of the turntable 30, is attached to the turntable 30 by the shoulder bolt nut 52. The turntable 30 and its components are fixedly attached to the elongate support member 10 where the elongate support member 10 is locked into position by a fastening pin 15.

FIG. 8 is a disconnected perspective view of an alternative embodiment of the present invention. The elongate support member 10 may further include an intermediate portion 14 located between the connective end 13 and the table support end 12. The intermediate portion 14 is configured to lower the table support end 12 below the connective end 13 to enable the desired positioning of the hitch ball assemblies (26, 27, 28, 29). Collectively, the table support end 12, the intermediate portion 14 and the connective end 13 configure a substantially Z-shaped elongate support member 10 and is preferably constructed from square-shaped and welded tubular steel. The intermediate portion 14 of the elongate support member 10 may be oriented at substantially right angles to the connective end 13 and to the table support end 12 thereby establishing a substantially upright orientation of the intermediate portion 14 when the hitch mount assembly 5 is properly installed upon a towing vehicle.

Figure 9:
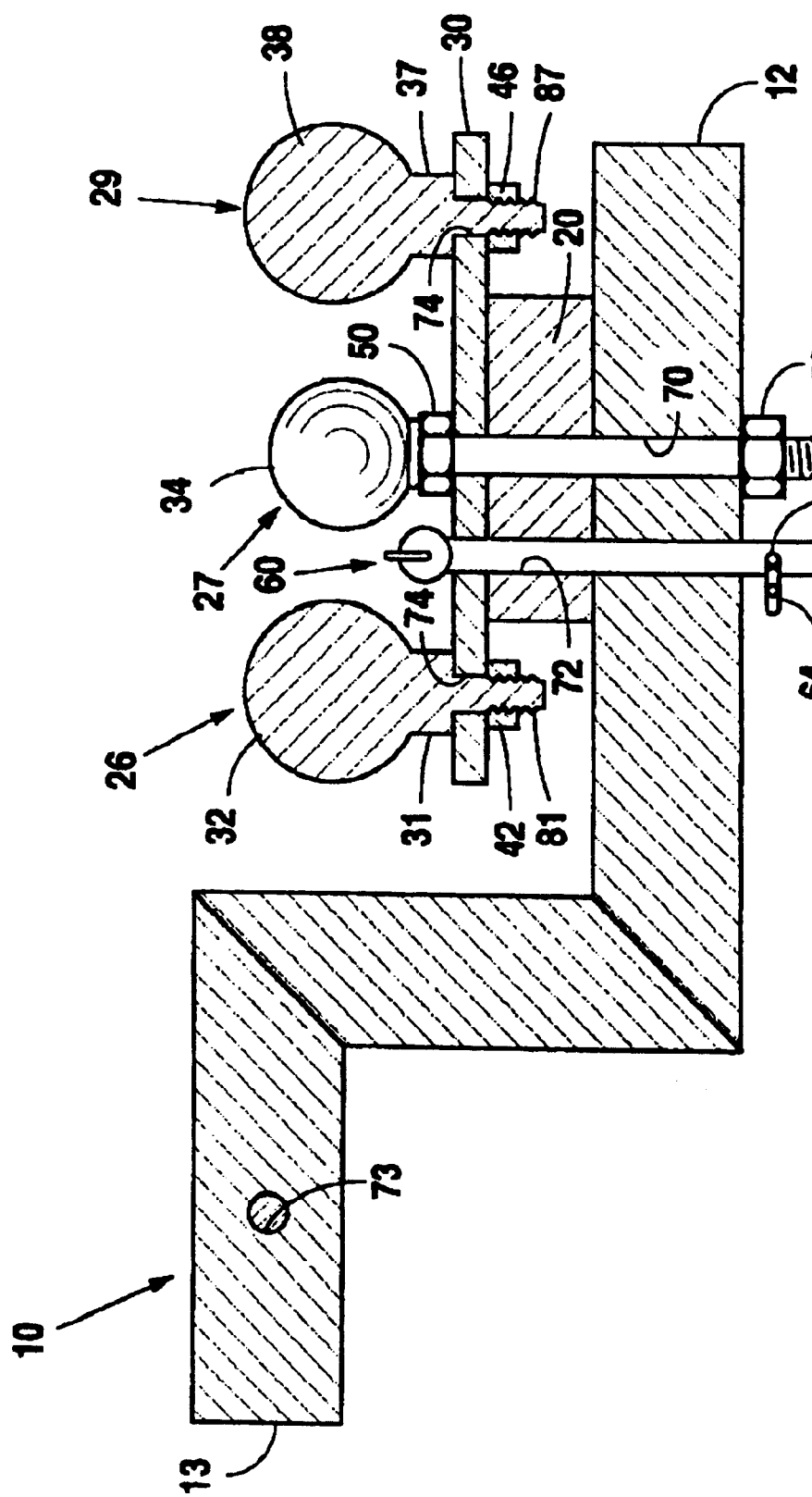
FIG. 9 is a longitudinal cross-sectional view of the embodiment of the invention shown in FIG. 8.

FIG. 9 is a cross-sectional view of the embodiment of the hitch assembly 5 shown in FIG. 8. This view illustrates the several apertures and the elements received therein when taken along a longitudinal axis of the assembly 5.

A portable ball hitch assembly 5 and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

Industrial Applicability

The present invention finds applicability in the towing vehicle industries namely, camping trailers, mobile homes, pick-up trucks and the like.

What is claimed and desired to be secured by letters patent is as follows:

1. A hitch mount assembly comprising:
   an elongate support member having a longitudinal axis for parallel orientation with a longitudinal axis of a towing vehicle, said elongate support member comprising a connective end adapted to be coupled to a receiver on a towing vehicle and a table support end oppositely located from said connective end;
   a turntable rotatably coupled to said elongate support member at said table support end by a rotation facilitating mounting;
   a plurality of hitch ball assemblies mounted to said turntable, each hitch ball assembly comprising a ball portion positioned above said turntable, a post portion that extends through said turntable through a ball mounting aperture in said turntable, and a threaded end of said post portion extending below said turntable;
   a spacing member interposed between said turntable and said elongate support member, said spacing member configured to establish a clearance space between a lower surface of said turntable and an upper surface of said elongate support member for accommodating rotational travel of said threaded ends of said post portions between said lower surface of said turntable and said upper surface of said elongate support member, said clearance space having a height only slightly greater than a length of said extending threaded end of said post portion below said lower surface of said turntable, said clearance space being minimized thereby minimizing a length of a moment arm measured between said turntable and said elongate support member;
   a locking mechanism adapted to releaseably fix said turntable with respect to said elongate support member, said locking mechanism further comprising alignable apertures through said turntable, said spacing member and said elongate support member and an insertable locking pin configured for removable insertion through said alignable apertures from above said turntable to below said elongate support member; and
   said turntable and said rotation facilitating mounting adapted to accommodate 360 degree rotation of said turntable relative to said elongate support member when said plurality of hitch ball assemblies are mounted to said turntable.

2. The invention as recited in claim 1, wherein said elongate support further comprises an intermediate portion between said connective end and said table support end, said intermediate portion configured to lower said table support end below said connective end thereby enabling proper positioning of said plurality of ball assemblies for trailer tongue connections thereto when a receiver on a towing vehicle upon which said hitch mount assembly is installed is at an above-standard height above ground.

3. The invention as recited in claim 2, wherein said connective end, said table support end and said intermediate portion together form a substantially Z-shaped elongate support member.

4. The invention as recited in claim 3, wherein said intermediate portion of said elongate support member is oriented at substantially right angles to said connective end and to said table support end.

5. The invention as recited in claim 4, wherein said intermediate portion of said elongate support member is oriented substantially upright when said hitch mount assembly is properly installed upon a towing vehicle.

6. The invention as recited in claim 4, wherein said connective end, said table support end and said intermediate portion are constructed from square-shaped tubular steel.

7. The invention as recited in claim 1, wherein said plurality of hitch ball assemblies number at least four.

8. The invention as recited in claim 7, wherein said plurality of hitch ball assemblies are diametrically and equally spaced upon said turntable.

9. The invention as recited in claim 7, wherein each ball portion of said plurality of hitch ball assemblies is differently sized thereby providing a selection of ball sizes to a user for accommodating differently configured trailer connections.

10. The invention as recited in claim 9, wherein each hitch ball assembly is secured to said turntable by a threaded nut screwably engaged upon said threaded end of said post portion and tightened up against said lower surface of said turntable.

11. The invention as recited in claim 1 wherein said connective end of said elongate support configured for insertable reception into a complementarity shaped receiver mounted on a towing vehicle.

12. The invention as recited in claim 11, wherein an insertable portion of said connective end of said elongate support is square shaped.

13. The invention as recited in claim 12, further comprising:
   said insertable portion of said connective end of said elongate support having a securing aperture therethrough for receiving a fastening pin therein; and
   a fastening pin adapted for aligned insertion through said securing aperture and an aligned aperture in a receiver mounted on a towing vehicle for releaseably securing said elongate support member to a towing vehicle.

14. The invention as recited in claim 1 wherein each of said alignable apertures is diametrically aligned with at least one hitch ball assembly.

15. The invention as recited in claim 1, wherein one alignable aperture is used for each pair of diametrically oppositely oriented hitch ball assemblies and each of said alignable apertures is diametrically aligned with said pair of diametrically oppositely oriented hitch ball assemblies.

* * * * *